United States Patent
Yang et al.

(10) Patent No.: US 9,900,075 B2
(45) Date of Patent: Feb. 20, 2018

(54) METHOD AND DEVICE FOR REPORTING SIGNAL QUALITY MEASUREMENT INFORMATION

(71) Applicant: Huawei Technologies Co., Ltd., Shenzhen (CN)

(72) Inventors: Xiaodong Yang, Beijing (CN); Jianguo Wang, Bonn (DE); Yongqiang Gao, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 9 days.

(21) Appl. No.: 14/952,684

(22) Filed: Nov. 25, 2015

(65) Prior Publication Data

US 2016/0080061 A1    Mar. 17, 2016

Related U.S. Application Data

(63) Continuation of application No. PCT/CN2013/076264, filed on May 27, 2013.

(51) Int. Cl.
*H04K 1/10*      (2006.01)
*H04L 27/28*    (2006.01)
(Continued)

(52) U.S. Cl.
CPC ......... *H04B 7/0632* (2013.01); *H04B 7/0456* (2013.01); *H04B 7/0617* (2013.01); *H04W 24/02* (2013.01); *H04W 24/10* (2013.01)

(58) Field of Classification Search
CPC .. H04B 7/0632; H04B 7/0456; H04B 7/0617; H04W 24/02; H04W 24/10; H04L 5/0057; H04L 5/0048
(Continued)

(56) References Cited

U.S. PATENT DOCUMENTS 6,400,317 B2    6/2002  Rouphael et al.
9,276,646 B2 *  3/2016  Chu .................. H04B 7/024
(Continued)

FOREIGN PATENT DOCUMENTS

CN    101841356 A    9/2010
CN    101848485 A    9/2010
(Continued)

*Primary Examiner* — Phuong Phu
(74) *Attorney, Agent, or Firm* — Womble Bond Dickinson (US) LLP

(57) ABSTRACT

The present invention discloses a method and a device for reporting signal quality measurement information. Main content includes: receiving, by a terminal, a signal quality measurement configuration message sent by a base station; determining signal quality measurement information according to a channel weighting instruction carried in the received signal quality measurement configuration message; and sending the signal quality measurement information to the base station, so that the base station adjusts a downtilt angle of an antenna of the base station according to the received signal quality measurement information, so as to change signal coverage of the antenna, thereby avoiding problems of system resource wastes and poor quality of service of a signal that are caused by the fact that signal coverage areas overlap when a downtilt angle of an antenna is adjusted randomly in an active antenna system, and improving the efficiency of terminal switching between cells.

24 Claims, 6 Drawing Sheets

(51) Int. Cl.
*H04B 7/06* (2006.01)
*H04W 24/02* (2009.01)
*H04B 7/0456* (2017.01)
*H04W 24/10* (2009.01)

(58) Field of Classification Search
USPC .................. 375/260, 267, 299, 346, 247
See application file for complete search history.

(56) References Cited

U.S. PATENT DOCUMENTS

| | | | |
|---|---|---|---|
| 9,374,716 B2* | 6/2016 | Enescu | ................ H04W 24/02 |
| 2011/0141987 A1 | 6/2011 | Nam et al. | |
| 2012/0045018 A1 | 2/2012 | Zhou et al. | |
| 2012/0250562 A1 | 10/2012 | Li et al. | |
| 2013/0039199 A1 | 2/2013 | Liao et al. | |
| 2013/0260779 A1 | 10/2013 | Sohn et al. | |
| 2014/0016496 A1 | 1/2014 | Su et al. | |
| 2014/0241274 A1* | 8/2014 | Lee | ...................... H04L 5/0048 370/329 |
| 2015/0289155 A1* | 10/2015 | Gao | ...................... H04L 5/0057 370/252 |

FOREIGN PATENT DOCUMENTS

| | | |
|---|---|---|
| CN | 101902305 A | 10/2010 |
| CN | 102026272 A | 4/2011 |
| CN | 103053196 A | 4/2011 |
| CN | 102469496 A | 5/2012 |
| CN | 102668644 A | 9/2012 |
| EP | 2637435 A1 | 9/2013 |
| WO | WO 2012059000 A1 | 5/2012 |
| WO | WO 2012086926 A1 | 6/2012 |
| WO | 2012112281 A2 | 8/2012 |

\* cited by examiner

METHOD AND DEVICE FOR REPORTING SIGNAL QUALITY MEASUREMENT INFORMATION

CROSS-REFERENCE

This application is a continuation of International Patent Application No. PCT/CN2013/076264, filed on May 27, 2013, which is hereby incorporated by reference in its entirety.

TECHNICAL FIELD

The present invention relates to the field of wireless communications technologies, and in particular, to a method and a device for reporting signal quality measurement information.

BACKGROUND

In the field of communications technologies, to reduce construction costs of a communications system, and also increase a communication capacity of a communications system under an architecture of an existing communications system, the prior art provides a solution of deploying an active antenna system (AAS) in a base station system, so as to satisfy requirements of changing coverage of a base station antenna.

The active antenna system refers to an antenna system in which a downtilt angle of a base station antenna can be adjusted freely, to further change a signal radiation angle of the antenna system in a perpendicular direction, so as to change signal coverage of the antenna system. A difference exists between the active antenna system and a conventional base station antenna system, and lies in that: the conventional base station antenna system is provided with a fixed downtilt angle, and once an antenna is completely installed, signal coverage of the antenna system is fixed; while, in the active antenna system, signal coverage of the base station antenna system can be adjusted freely.

Specifically, in the active antenna system, a working principle that a change of a downtilt angle of a base station antenna may cause a change of signal coverage of an antenna is:

performing signal weighting processing on a demodulation reference signal (DMRS) of a base station antenna by using a precoding parameter W, so that signal coverage of the base station antenna is changed.

For example, signal coverage of a conventional base station antenna obtained through calculation by using the following formula is: $R_0 = HX_{DMRS} + N$, where H is a channel matrix, $X_{DMRS}$ is a modulation symbol corresponding to a DMRS reference signal sequence, and N is measured noise of a base station antenna and/or measured interference on a base station antenna.

Signal coverage that is obtained through calculation by using the following formula and obtained after adjustment of a base station antenna in an active antenna system is: $R_1 = HW_{precoding} X_{DMRS} + N$, where the matrix $W_{precoding}$ is a precoding matrix.

FIG. 1 is a schematic structural diagram showing a change of signal coverage of an antenna caused due to a change of a downtilt angle of the base station antenna in an active antenna system. As can be seen from FIG. 1, a signal coverage area of $R_1$ is greater than a signal coverage area of $R_0$.

However, it is found during research that: in a process in which a base station provided with an active antenna performs weighting processing on a DMRS signal, the following problem exists:

All base stations perform weighting on a DMRS signal, so that when signal coverage of an antenna is changed, a problem of antenna signal overlapping may occur, which not only easily causes system resource wastes, but also causes that interference may occur in an overlapping area of antenna signals, thereby reducing quality of service of a signal of a communications system.

Therefore, a method for self-adaptively adjusting signal coverage of an antenna is urgently needed to resolve problems of system resource wastes and low quality of service of a signal in an active antenna system.

SUMMARY

Embodiments of the present invention provide a method and a device for reporting signal quality measurement information, so as to resolve problems of system resource wastes and poor quality of service of a signal in an active antenna system.

According to a first aspect of the present invention, a method for reporting signal quality measurement information is provided, including:

receiving a signal quality measurement configuration message sent by a base station;

determining signal quality measurement information according to a channel weighting instruction carried in the received signal quality measurement configuration message; and sending the signal quality measurement information to the base station.

In a first possible implementation manner of the first aspect, the determining signal quality measurement information according to a channel weighting instruction carried in the received signal quality measurement configuration message includes:

determining a channel weighting matrix of an adjacent cell according to the channel weighting instruction carried in the received signal quality measurement configuration message; and determining signal quality measurement information of the adjacent cell according to the channel weighting matrix.

With reference to the first possible implementation manner of the first aspect, in a second possible implementation manner, the determined channel weighting matrix of the adjacent cell is a precoding matrix in a codebook; and the method further includes:

sending a precoding matrix indicator PMI to the base station, where the PMI corresponds to the determined channel weighting matrix of the adjacent cell.

With reference to the first aspect, or the first possible implementation manner of the first aspect, or the second possible implementation manner of the first aspect, in a third possible implementation manner, the determining signal quality measurement information according to a channel weighting instruction carried in the received signal quality measurement configuration message includes:

receiving a reference signal of a serving cell according to the channel weighting instruction carried in the received signal quality measurement configuration message; and obtaining signal quality measurement information of the serving cell according to the reference signal.

With reference to the third possible implementation manner of the first aspect, in a fourth possible implementation manner, the signal quality measurement information includes at least one or more of: reference signal receiving power, a reference signal strength indicator, and reference signal receiving quality.

With reference to the first aspect, or the fourth possible implementation manner of the first aspect, in a fifth possible implementation manner, the sending the signal quality measurement information to the base station includes:

sending the signal quality measurement information to the base station according to a subframe period and subframe offset information that are carried in the received signal quality measurement configuration message.

With reference to the first aspect, or the fourth possible implementation manner of the first aspect, in a sixth possible implementation manner, the sending the signal quality measurement information to the base station includes:

when the determined signal quality measurement information is greater than a set threshold, sending the signal quality measurement information to the base station.

According to a second aspect of the present invention, a method for reporting signal quality measurement information is provided, including:

sending a signal quality measurement configuration message to a terminal, where the signal quality measurement configuration message carries a channel weighting instruction; and receiving signal quality measurement information sent by the terminal, where the signal quality measurement information is determined by the terminal according to the channel weighting instruction carried in the received signal quality measurement configuration message.

In a first possible implementation manner of the second aspect, the receiving signal quality measurement information sent by the terminal includes:

receiving signal quality measurement information of an adjacent cell sent by the terminal, where the signal quality measurement information of the adjacent cell is obtained, after the terminal determines a channel weighting matrix of the adjacent cell according to the channel weighting instruction carried in the received signal quality measurement configuration message, according to the channel weighting matrix.

With reference to the first possible implementation manner of the second aspect, in a second possible implementation manner, the determined channel weighting matrix is a precoding matrix in a codebook; and the method further includes:

receiving a precoding matrix indicator PMI sent by the terminal, where the PMI corresponds to the determined channel weighting matrix of the adjacent cell.

With reference to the second aspect, or the first possible implementation manner of the second aspect, or the second possible implementation manner of the second aspect, in a third possible implementation manner, the receiving signal quality measurement information sent by the terminal includes:

receiving signal quality measurement information of a serving cell sent by the terminal, where the signal quality measurement information of the serving cell is obtained, after the terminal receives a reference signal of the serving cell according to the channel weighting instruction carried in the received signal quality measurement configuration message, according to the reference signal.

With reference to the third possible implementation manner of the second aspect, in a fourth possible implementation manner, the signal quality measurement information includes at least one or more of: reference signal receiving power, a reference signal strength indicator, and reference signal receiving quality.

According to a third aspect of the present invention, a terminal device is provided, including:

a receiving module, configured to receive a signal quality measurement configuration message sent by a base station;

a determining module, configured to determine signal quality measurement information according to a channel weighting instruction carried in the signal quality measurement configuration message received by the receiving module; and a sending module, configured to send the signal quality measurement information determined by the determining module to the base station.

In a first possible implementation manner of the third aspect, the determining module is configured to determine a channel weighting matrix of an adjacent cell according to the channel weighting instruction carried in the received signal quality measurement configuration message, and determine signal quality measurement information of the adjacent cell according to the channel weighting matrix.

With reference to the first possible implementation manner of the third aspect, in a second possible implementation manner, the determined channel weighting matrix of the adjacent cell is a precoding matrix in a codebook; and the device further includes:

a precoding indicator sending module, configured to send a precoding matrix indicator PMI to the base station, where the PMI corresponds to the determined channel weighting matrix of the adjacent cell.

With reference to the third aspect, or the first possible implementation manner of the third aspect, or the second possible implementation manner of the third aspect, in a third possible implementation manner, the determining module is configured to receive a reference signal of a serving cell according to the channel weighting instruction carried in the signal quality measurement configuration message received by the receiving module, and obtain signal quality measurement information of the serving cell according to the reference signal.

With reference to the third possible implementation manner of the third aspect, in a fourth possible implementation manner, the signal quality measurement information includes at least one or more of: reference signal receiving power, a reference signal strength indicator, and reference signal receiving quality.

With reference to the third aspect, or the fourth possible implementation manner of the third aspect, in a fifth possible implementation manner, the sending module is configured to send the signal quality measurement information to the base station according to a subframe period and subframe offset information that are carried in the signal quality measurement configuration message received by the receiving module.

With reference to the third aspect, or the fourth possible implementation manner of the third aspect, in a sixth possible implementation manner, the sending module is configured to: when the signal quality measurement information determined by the determining module is greater than a set threshold, send the signal quality measurement information to the base station.

According to a fourth aspect of the present invention, a base station device is provided, including:

a configuration message sending module, configured to send a signal quality measurement configuration message to a terminal, where the signal quality measurement configuration message carries a channel weighting instruction; and a measurement information receiving module, configured to receive signal quality measurement information sent by the terminal, where the signal quality measurement information is determined by the terminal according to the channel weighting instruction carried in the received signal quality measurement configuration message.

In a first possible implementation manner of the fourth aspect, the measurement information receiving module is configured to receive signal quality measurement information of an adjacent cell sent by the terminal, where the signal quality measurement information of the adjacent cell is obtained, after the terminal determines a channel weighting matrix of the adjacent cell according to the channel weighting instruction carried in the received signal quality measurement configuration message, according to the channel weighting matrix.

With reference to the first possible implementation manner of the fourth aspect, in a second possible implementation manner, the determined channel weighting matrix is a precoding matrix in a codebook; and the device further includes:

a precoding indicator receiving module, configured to receive a precoding matrix indicator PMI sent by the terminal, where the PMI corresponds to the determined channel weighting matrix of the adjacent cell.

With reference to the fourth aspect, or the first possible implementation manner of the fourth aspect, or the second possible implementation manner of the fourth aspect, in a third possible implementation manner, the measurement information receiving module is configured to receive signal quality measurement information of a serving cell sent by the terminal, where the signal quality measurement information of the serving cell is obtained, after the terminal receives a reference signal of the serving cell according to the channel weighting instruction carried in the received signal quality measurement configuration message, according to the reference signal.

With reference to the third possible implementation manner of the fourth aspect, in a fourth possible implementation manner, the signal quality measurement information includes at least one or more of: reference signal receiving power, a reference signal strength indicator, and reference signal receiving quality.

According to a fifth aspect of the present invention, a device for reporting signal quality measurement information is provided, including:

a receiving unit, configured to receive a signal quality measurement configuration message sent by a base station;

a determining unit, configured to determine signal quality measurement information according to a channel weighting instruction carried in the received signal quality measurement configuration message; and a sending unit, configured to send the signal quality measurement information to the base station.

In a first possible implementation manner of the fifth aspect, the determining unit is configured to determine a channel weighting matrix of an adjacent cell according to the channel weighting instruction carried in the received signal quality measurement configuration message, and determine signal quality measurement information of the adjacent cell according to the channel weighting matrix.

With reference to the first possible implementation manner of the fifth aspect, in a second possible implementation manner, the determined channel weighting matrix of the adjacent cell is a precoding matrix in a codebook; and the device further includes:

a precoding indicator sending unit, configured to send a precoding matrix indicator PMI to the base station, where the PMI corresponds to the determined channel weighting matrix of the adjacent cell.

With reference to the fifth aspect, or the first possible implementation manner of the fifth aspect, or the second possible implementation manner of the fifth aspect, in a third possible implementation manner, the determining unit is configured to receive a reference signal of a serving cell according to the channel weighting instruction carried in the received signal quality measurement configuration message, and obtain signal quality measurement information of the serving cell according to the reference signal.

With reference to the third possible implementation manner of the fifth aspect, in a fourth possible implementation manner, the signal quality measurement information includes at least one or more of: reference signal receiving power, a reference signal strength indicator, and reference signal receiving quality.

With reference to the fifth aspect, or the fourth possible implementation manner of the fifth aspect, in a fifth possible implementation manner, the sending unit is configured to send the signal quality measurement information to the base station according to a subframe period and subframe offset information that are carried in the received signal quality measurement configuration message.

With reference to the fifth aspect, or the fourth possible implementation manner of the fifth aspect, in a sixth possible implementation manner, the sending unit is configured to: when the determined signal quality measurement information is greater than a set threshold, send the signal quality measurement information to the base station.

According to a sixth aspect of the present invention, a device for reporting signal quality measurement information is provided, including:

a configuration message sending unit, configured to send a signal quality measurement configuration message to a terminal, where the signal quality measurement configuration message carries a channel weighting instruction; and a measurement information receiving unit, configured to receive signal quality measurement information sent by the terminal, where the signal quality measurement information is determined by the terminal according to the channel weighting instruction carried in the received signal quality measurement configuration message.

In a first possible implementation manner of the sixth aspect, the measurement information receiving unit is configured to receive signal quality measurement information of an adjacent cell sent by the terminal, where the signal quality measurement information of the adjacent cell is obtained, after the terminal determines a channel weighting matrix of the adjacent cell according to the channel weighting instruction carried in the received signal quality measurement configuration message, according to the channel weighting matrix.

With reference to the first possible implementation manner of the sixth aspect, in a second possible implementation manner, the determined channel weighting matrix is a precoding matrix in a codebook; and the device further includes:

a precoding indicator receiving unit, configured to receive a precoding matrix indicator PMI sent by the terminal, where the PMI corresponds to the determined channel weighting matrix of the adjacent cell.

With reference to the sixth aspect, or the first possible implementation manner of the sixth aspect, or the second possible implementation manner of the sixth aspect, in a third possible implementation manner, the measurement information receiving unit is configured to receive signal quality measurement information of a serving cell sent by the terminal, where the signal quality measurement information of the serving cell is obtained, after the terminal receives a reference signal of the serving cell according to the channel weighting instruction carried in the received signal quality measurement configuration message, according to the reference signal.

With reference to the third possible implementation manner of the sixth aspect, in a fourth possible implementation manner, the signal quality measurement information includes at least one or more of: reference signal receiving power, a reference signal strength indicator, and reference signal receiving quality.

In the embodiments of the present invention, a terminal receives a signal quality measurement configuration message sent by a base station; determines signal quality measurement information according to a channel weighting instruction carried in the received signal quality measurement configuration message; and sends the signal quality measurement information to the base station, so that the base station adjusts a downtilt angle of an antenna of the base station according to the received signal quality measurement information, to change signal coverage of the antenna, thereby avoiding problems of system resource wastes and poor quality of service of a signal that are caused by the fact that signal coverage areas overlap when a downtilt angle of an antenna is adjusted randomly in an active antenna system, and improving the efficiency of terminal switching between cells.

DESCRIPTION OF EMBODIMENTS

To achieve the objectives of the present invention, embodiments of the present invention provide a method and a device for reporting signal quality measurement information. A terminal receives a signal quality measurement configuration message sent by a base station; determines signal quality measurement information according to a channel weighting instruction carried in the received signal quality measurement configuration message; and sends the signal quality measurement information to the base station, so that the base station adjusts signal coverage of a base station antenna according to the received signal quality measurement information, so as to change signal coverage of the antenna, thereby avoiding problems of system resource wastes and poor quality of service of a signal that are caused by the fact that signal coverage areas overlap when a downtilt angle of an antenna is adjusted randomly in an active antenna system, and improving the efficiency of terminal switching between cells.

The following describes in detail the embodiments of the present invention with reference to the accompanying drawings of the specification.

Embodiment 1

Figure 1:
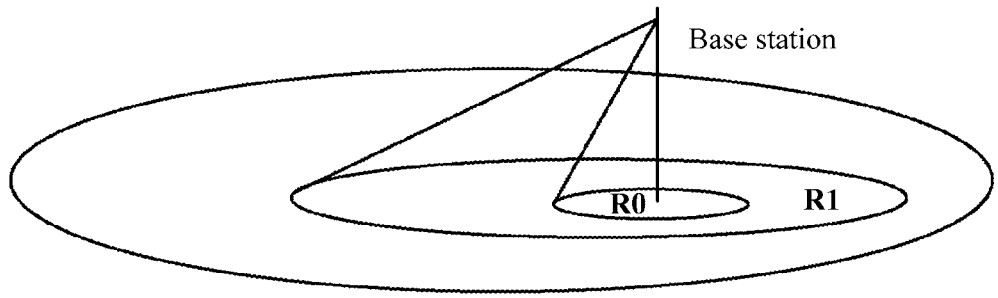
FIG. 1 is a schematic structural diagram showing a change of signal coverage of an antenna caused due to a change of a downtilt angle of the base station antenna in an active antenna system.
Figure 2:
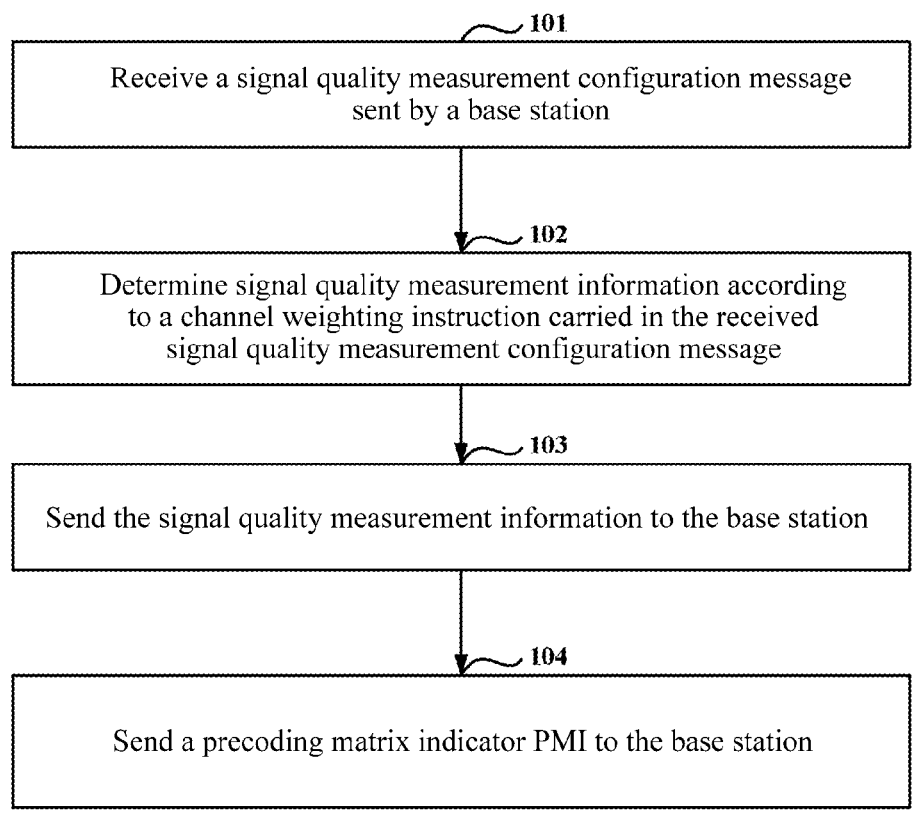
FIG. 2 is a schematic flowchart of a method for reporting signal quality measurement information according to Embodiment 1 of the present invention.

Referring to FIG. 2, FIG. 2 is a schematic flowchart of a method for reporting signal quality measurement information according to Embodiment 1 of the present invention, and the method includes:

Step 101: Receive a signal quality measurement configuration message sent by a base station.

The signal quality measurement configuration message may carry one or more of: a type of a signal that a terminal is instructed to measure, information about content of a reported measurement result, information about a time for reporting a measurement result, information about a trigger event of reporting a measurement result, and a channel weighting instruction, which is not limited herein.

It should be noted that, content carried in the signal quality measurement configuration message sent by the base station may be partially deployed according to actual needs, or may be all deployed in a unified manner according to theoretical needs, which is not limited herein.

Specifically, in step 101, a time at which the terminal receives the signal quality measurement configuration message sent by the base station may be: after the terminal is connected to a serving cell and before the terminal is ready for switching between cells, the terminal receives a signal quality measurement configuration message of the serving cell sent by the base station; or may be: when the terminal is ready for switching between cells, the terminal receives a signal quality measurement configuration message of the serving cell sent by the base station, which is not limited herein.

Specifically, the terminal receives, by using higher-layer signaling (for example, radio resource control (RRC)) signaling or dynamic signaling (for example, downlink control information (DCI)), the signal quality measurement configuration message sent by the base station.

The RRC signaling is sent by using a physical downlink shared channel (PDSCH); and the DCI is sent by using a physical downlink control channel (PDCCH), or an enhanced PDCCH (EPDCCH).

Step 102: Determine signal quality measurement information according to a channel weighting instruction carried in the received signal quality measurement configuration message.

An object signal of the signal quality measurement information may be a reference signal (RS), where the reference signal includes, but not limited to, a CRS (Cell Reference Signal), a reduced cell reference signal (Reduced CRS), a CSI RS (channel state information reference signal), and a DMRS (demodulation reference signal).

The object signal of the signal quality measurement information may also be another signal (for example, a signal sent on a physical channel), which is not limited herein.

It should be noted that, the following embodiments are described by using signal quality measurement of a reference signal as an example, however, it should be understood that, embodiments involved in the present invention are also applicable to a physical signal that can be received by another terminal.

Specifically, in step 102, the determining signal quality measurement information according to a channel weighting instruction carried in the received signal quality measurement configuration message specifically includes the following:

First, the terminal measures, according to the received signal quality measurement configuration message, a signal that can be received.

The signal that can be received includes at least one or more of: a pilot signal and/or a reference signal of a serving cell, and/or, a reference signal or a pilot signal of an adjacent cell.

For example, the terminal measures a CRS signal of the serving cell according to the received signal quality measurement configuration message; and the terminal measures a CRS signal of the adjacent cell according to the received signal quality measurement configuration message.

Second, determine feature information, obtained through measurement, of the signal according to the channel weighting instruction carried in the received signal quality measurement configuration message.

The feature information of the signal includes at least: reference signal receiving power, or feature information, obtained according to the signal, of a channel from the terminal to the serving cell or from the terminal to the adjacent cell.

The channel feature information includes at least one or more of: a channel matrix, a channel weighting matrix, a signal transmission path, signal attenuation, multipath effect, and a Doppler frequency shift.

Specifically, when the channel weighting instruction carried in the signal quality measurement configuration message received by the terminal is to instruct the terminal to perform weighting processing on a channel matrix from the terminal to the adjacent cell, the terminal obtains the channel matrix from the terminal to the adjacent cell according to the received channel weighting instruction and the reference signal of the adjacent cell, and obtains the channel weighting matrix according to a predefined criterion.

The predefined criterion may be a capacity maximization criterion or mutual information maximization criterion, which specifically is not limited herein.

Preferably, the determined channel weighting matrix of the adjacent cell may be a precoding matrix selected from a codebook, where the selected precoding matrix may correspond to one corresponding precoding matrix indicator PMI.

Specifically, using the reference signal of the adjacent cell as an example, a calculation method for obtaining the channel matrix from the terminal to the adjacent cell according to the received channel weighting instruction and the reference signal of the adjacent cell, obtaining the channel weighting matrix according to the predefined criterion, and determining the signal quality measurement information RSRP of the adjacent cell according to the channel weighting matrix includes, but not limited, the following:

First, assume that the channel matrix from the terminal to the adjacent cell obtained according to the reference signal of the adjacent cell is H(m), where m is a resource element number of the reference signal of the adjacent cell.

Second, obtain a relevant matrix R $$R = \sum_{m=1}^{K} [H(m)]^H H(m)$$

according to the channel matrix, where K is a total quantity of samples of resource elements (RE) available for the reference signal within a measured bandwidth, and eigenvalue decomposition may be performed on R to obtain one or more eigenvectors of R.

An eigenvector corresponding to a maximum eigenvalue is v, which may be used as the channel weighting matrix from the terminal to the adjacent cell.

Alternatively, assume that the channel matrix from the terminal to the adjacent cell obtained according to the reference signal of the adjacent cell is H(m), where m=1, 2, . . . , K; a precoding matrix v is selected from a codebook (for example, an LTE R8 2-antenna codebook) according to the channel capacity maximization criterion, and the selected precoding matrix v is used as the channel weighting matrix.

Third, determine an equivalent channel $h_e(m)=H(m) \cdot v$ by using the obtained channel weighting matrix v. Then, the signal quality measurement information RSRP of the adjacent cell is $$RSRP = \frac{1}{K-1} \left| \sum_{m=0}^{K-1} h_e(m) \cdot h_e(m+1) \right|.$$

Specifically, when the channel weighting instruction carried in the signal quality measurement configuration message received by the terminal is to instruct the terminal not to perform weighting processing on the channel matrix from the terminal to the serving cell, the terminal directly obtains the signal quality measurement information according to the received channel weighting instruction and the reference signal of the serving cell.

Specifically, using the reference signal of the serving cell as an example, a calculation method for directly obtaining the signal quality measurement information RSRP according to the received channel weighting instruction and the reference signal of the serving cell includes, but not limited to, the following:

Assuming that a total quantity of samples of resource elements (RE) available for the reference signal of the serving cell within a measured bandwidth is K, the RSRP of the reference signal is an average absolute value of multiple correlation of two adjacent resource elements (RE) of the reference signal:

$$RSRP = \frac{1}{K-1} \left| \sum_{m=0}^{K-1} \hat{h}(m) \cdot \hat{h}(m+1) \right|,$$

where ĥ(m) is channel estimation on a resource element numbered m, and ĥ(m) may be obtained by using the least square method or another method in the prior art.

Step 103: Send the signal quality measurement information to the base station.

The signal quality measurement information includes at least one or more of: RSRP (reference signal receiving power), a reference signal strength indicator, and RSRQ (reference signal receiving quality).

Specifically, in step 103, a manner in which the terminal sends the signal quality measurement information to the base station may include, but not limited to, the following several manners:

Manner 1: When it is determined according to the information, carried in the received signal quality measurement configuration message, about the time for reporting a measurement result that the current time point has reached the reporting time, send the signal quality measurement information to the base station.

The information about the reporting time may be information about a periodical time (for example, reporting is performed every 10 seconds), or may be information about a specific time point (for example, 10 seconds after a measurement message is received), which is not limited herein.

Specifically, the carried information about the reporting time for reporting a measurement result is a subframe period and subframe offset information, the terminal determines, according to the subframe period and subframe offset information that are used for reporting the signal quality measurement information and are carried in the received signal quality measurement configuration message, information about a time for reporting a measurement result, and when determining that the information of the time for reporting a measurement result arrives, sends the signal quality measurement information to the base station.

Optionally, the terminal may also send the measured reference signal and the obtained signal quality measurement information to the base station together.

Manner 2: When the determined signal quality measurement information is greater than a set threshold, send the signal quality measurement information to the base station.

The set threshold may be determined according to actual needs, or may be determined according to an A3 event defined in the LTE system, which is not limited herein.

Optionally, the set threshold may be determined according to the set threshold and the received signal quality measurement information that is determined according to the reference signal of the serving cell.

Specifically, first, the terminal determines whether the determined signal quality measurement information is greater than the set threshold.

Second, when a determining result of the terminal is that the determined signal quality measurement information is greater than the set threshold, send the signal quality measurement information to the base station.

Step 104: Send a precoding matrix indicator PMI to the base station.

The PMI corresponds to the determined channel weighting matrix of the adjacent cell.

It should be noted that, an execution time of step 104 may be any time for executing the present invention, and is not limited to a time after the terminal sends the signal quality measurement information to the base station.

Optionally, after the base station receives the signal quality measurement information sent by the terminal, a downtilt angle of an antenna currently connected to the base station is adjusted according to the signal quality measurement information, so as to change signal coverage of the antenna, and bring convenience to switching between adjacent base stations, thereby avoiding a problem of delay of signal transmission of a terminal caused by switching.

In the solution of Embodiment 1 of the present invention, a terminal receives a signal quality measurement configuration message sent by a base station; determines signal quality measurement information according to a channel weighting instruction carried in the received signal quality measurement configuration message; and sends the signal quality measurement information to the base station, so that the base station adjusts, according to the received signal quality measurement information, a downtilt angle of an antenna configured in the base station, so as to change signal coverage of the antenna, thereby avoiding problems of system resource wastes and poor quality of service of a signal that are caused by the fact that signal coverage areas overlap when a downtilt angle of an antenna is adjusted randomly in an active antenna system, and improving the efficiency of terminal switching between cells.

Embodiment 2

Figure 3:
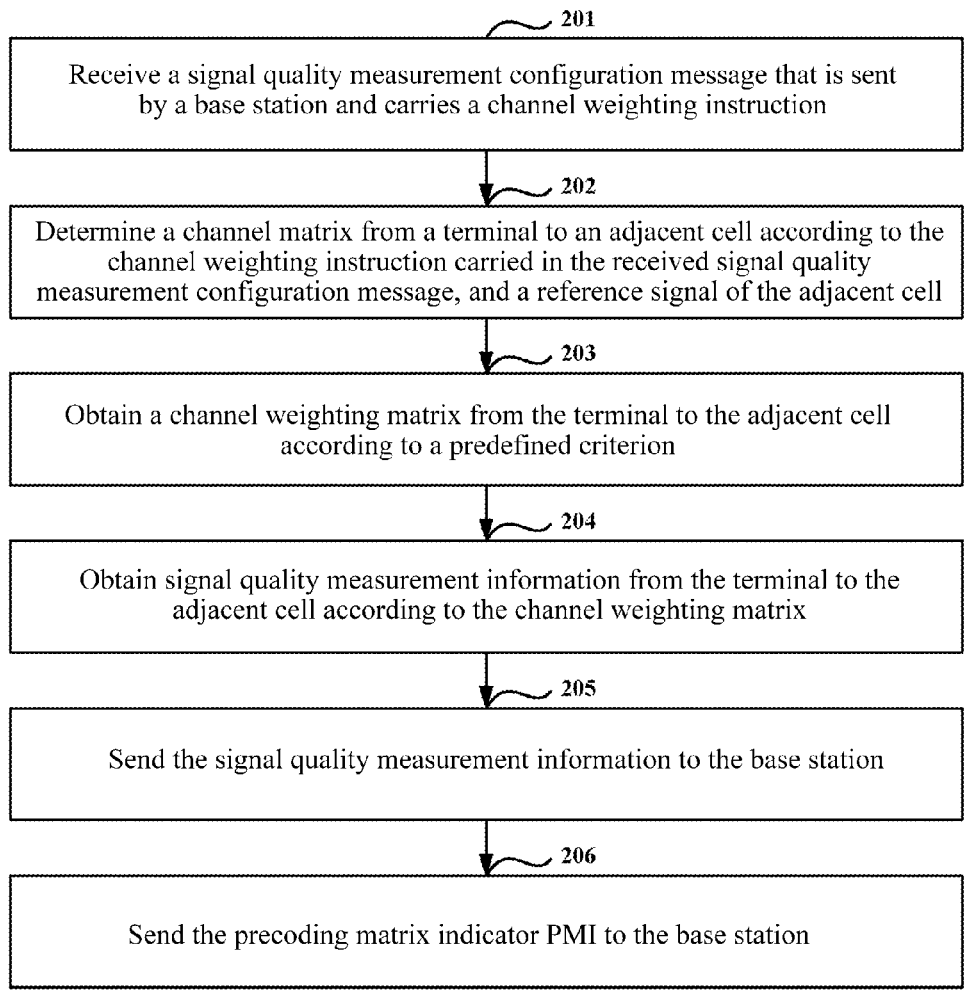
FIG. 3 is a schematic flowchart of a method for reporting signal quality measurement information according to Embodiment 2 of the present invention.

FIG. 3 is a schematic flowchart of a method for reporting signal quality measurement information according to Embodiment 2 of the present invention. Embodiment 2 of the present invention describes steps in Embodiment 1 of the present invention in detail, and the method includes:

Step 201: Receive a signal quality measurement configuration message that is sent by a base station and that carries a channel weighting instruction.

The channel weighting instruction is used to instruct a terminal to perform weighting processing on a channel matrix from the terminal to an adjacent cell.

Specifically, in step 201, the terminal receives, by using higher-layer signaling (for example, radio resource control (RRC) signaling) or dynamic signaling (for example, downlink control information (DCI)), the signal quality measurement configuration message sent by the base station.

The RRC signaling is sent by using a physical downlink shared channel (PDSCH) channel; and the DCI is sent by using a physical downlink control channel (PDCCH) channel, or an enhanced PDCCH (EPDCCH).

Step 202: Determine a channel matrix from a terminal to an adjacent cell according to the channel weighting instruction carried in the received signal quality measurement configuration message, and a reference signal of the adjacent cell.

Specifically, the reference signal includes, but not limited to: a cell reference signal (CRS, Cell Reference Signal), a reduced cell reference signal (Reduced CRS), a channel state information reference signal (CSI RS), and a demodulation reference signal (DMRS).

Specifically, in step 202, first, the terminal measures a signal of the adjacent cell according to the received signal quality measurement configuration message.

Second, the terminal obtains the channel matrix from the terminal to the adjacent cell according to the received channel weighting instruction and the reference signal of the adjacent cell.

Specifically, using the reference signal of the adjacent cell as an example, a calculation method for obtaining the channel matrix from the terminal to the adjacent cell according to the received channel weighting instruction and the reference signal of the adjacent cell, obtaining a channel weighting matrix from the terminal to the adjacent cell according to a predefined criterion, and determining the signal quality measurement information RSRP of the adjacent cell according to the channel weighting matrix includes, but not limited, the following:

First, assume that the channel matrix from the terminal to the adjacent cell obtained according to the reference signal of the adjacent cell is H(m), where m is a resource element number of the reference signal of the adjacent cell.

Second, obtain a relevant matrix R $$R = \sum_{m=1}^{K} [H(m)]^H H(m)$$

according to the channel matrix, where K is a total quantity of samples of resource elements (RE) available for the reference signal within a measured bandwidth, and eigenvalue decomposition may be performed on R to obtain one or more eigenvectors of R.

Step 203: Obtain a channel weighting matrix from the terminal to the adjacent cell according to a predefined criterion.

Specifically, in step 203, the first manner is: determine, according to the relevant matrix obtained in step 202, that an eigenvector corresponding to a maximum eigenvalue in the relevant matrix is v, and the eigenvector v may be used as the channel weighting matrix from the terminal to the adjacent cell.

The second manner is: assume that the channel matrix from the terminal to the adjacent cell obtained according to the reference signal of the adjacent cell is H(m), where m=1, 2, ..., K; a precoding matrix v is selected from a codebook (for example, an LTE R8 2-antenna codebook) according to a channel capacity maximization criterion, and the selected precoding matrix v is used as the channel weighting matrix from the terminal to the adjacent cell.

Step 204: Determine signal quality measurement information of the adjacent cell according to the channel weighting matrix.

Specifically, in step 204, an equivalent channel $h_e(m)=H(m) \cdot v$ is determined by using the obtained channel weighting matrix v, and then, the signal quality measurement information RSRP of the adjacent cell is $$RSRP = \frac{1}{K-1} \left| \sum_{m=0}^{K-1} h_e(m) \cdot h_e(m+1) \right|.$$

Step 205: Send the signal quality measurement information to the base station.

The signal quality measurement information includes at least one or more of: RSRP (reference signal receiving power), a reference signal strength indicator, and RSRQ (reference signal receiving quality).

Specifically, in step 205, a manner in which the terminal sends the signal quality measurement information to the base station may include, but not limited to, the following several manners:

Manner 1: When it is determined according to information, carried in the received signal quality measurement configuration message, about a time for reporting a measurement result that the current time point has reached the reporting time, send the signal quality measurement information to the base station.

The information about the reporting time may be information about a periodical time (for example, reporting is performed every 10 subframes or every 10 seconds), or may be information about a specific time point (for example, 10 subframes or 10 seconds after a measurement message is received), which is not limited herein.

Specifically, the carried information about the reporting time for reporting a measurement result is a subframe period and subframe offset information, the terminal determines, according to the subframe period and subframe offset information that are used for reporting the signal quality measurement information and are carried in the received signal quality measurement configuration message, information about a time for reporting a measurement result, and when determining that the information of the time for reporting a measurement result arrives, sends the signal quality measurement information to the base station.

Optionally, the terminal may also send the measured reference signal and the obtained signal quality measurement information to the base station together.

Manner 2: When the determined signal quality measurement information is greater than a set threshold, send the signal quality measurement information to the base station.

The set threshold may be determined according to actual needs, or may be determined according to an A3 event defined in the LTE system, which is not limited herein.

Optionally, the set threshold may be determined according to the set threshold and the received signal quality measurement information that is determined according to a reference signal of a serving cell.

Specifically, first, the terminal determines whether the determined signal quality measurement information is greater than the set threshold.

Second, when a determining result of the terminal is that the determined signal quality measurement information is greater than the set threshold, send the signal quality measurement information to the base station.

Step 206: Send a precoding matrix indicator PMI to the base station.

The PMI corresponds to the determined channel weighting matrix of the adjacent cell.

It should be noted that, an execution time of step 206 may be any time for executing the present invention, and is not limited to a time after the terminal sends the signal quality measurement information to the base station.

Optionally, the base station adjusts, according to the received signal quality measurement information, a downtilt angle of an antenna configured in the base station, so as to change signal coverage of the antenna.

By using the solution in Embodiment 2 of the present invention, problems of system resource wastes and poor quality of service of a signal that are caused by the fact that signal coverage areas overlap when a downtilt angle of an antenna is adjusted randomly in an active antenna system are avoided, thereby improving the efficiency of terminal switching between cells.

Embodiment 3

Figure 4:
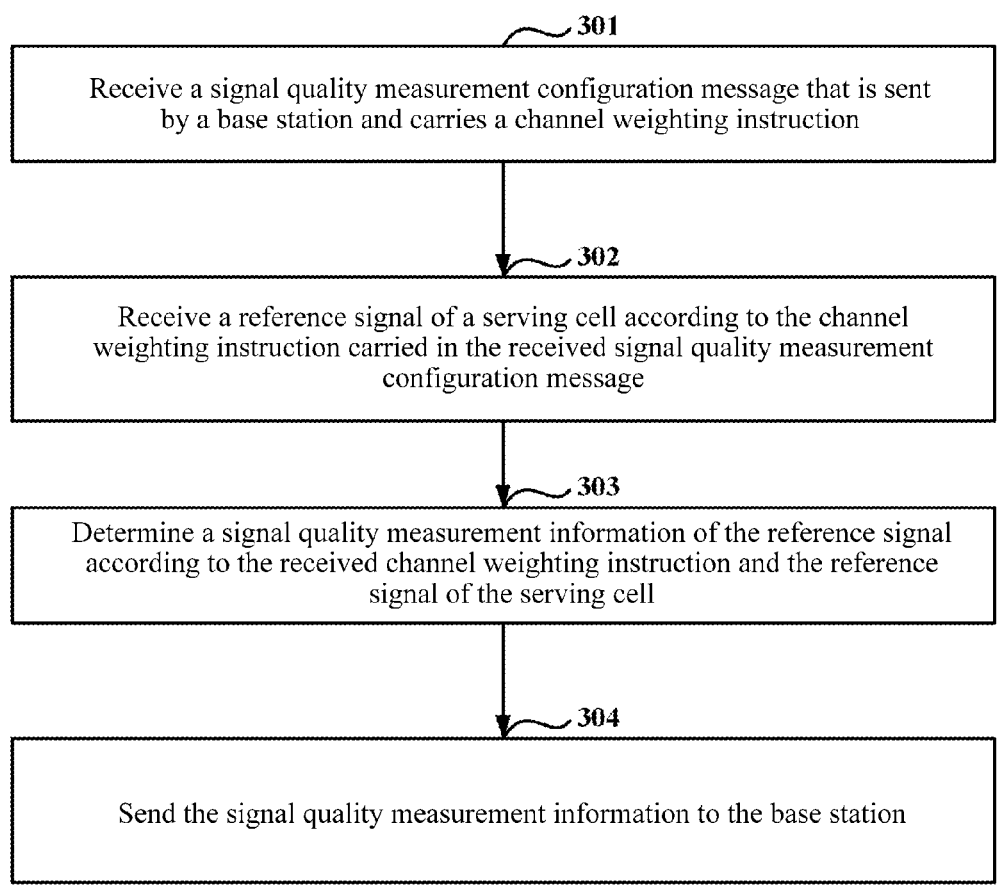
FIG. 4 is a schematic flowchart of a method for reporting signal quality measurement information according to Embodiment 3 of the present invention.

FIG. 4 is a schematic flowchart of a method for reporting signal quality measurement information according to Embodiment 3 of the present invention. Embodiment 3 of the present invention describes steps in Embodiment 1 of the present invention in detail, and the method includes:

Step 301: Receive a signal quality measurement configuration message that is sent by a base station and carries a channel weighting instruction.

The channel weighting instruction is used to instruct a terminal to perform weighting processing on a channel matrix from the terminal to a serving cell.

Specifically, in step 301, the terminal receives, by using higher-layer signaling (for example, radio resource control (RRC) signaling) or dynamic signaling (for example, downlink control information (DCI)), the signal quality measurement configuration message sent by the base station.

The RRC signaling is sent by using a physical downlink shared channel (PDSCH) channel; and the DCI is sent by using a physical downlink control channel (PDCCH) channel, or an enhanced PDCCH (EPDCCH).

Step 302: Receive a reference signal of a serving cell according to the channel weighting instruction carried in the received signal quality measurement configuration message.

Specifically, the reference signal includes, but not limited to: a cell reference signal (CRS), a reduced cell reference signal (reduced CRS), a channel state information reference signal (CSI RS), and a demodulation reference signal (DMRS).

Specifically, in step 302, the terminal measures the reference signal of the serving cell according to the received signal quality measurement configuration message.

Step 303: Determine signal quality measurement information of the reference signal according to the received channel weighting instruction and the reference signal of the serving cell.

Specifically, using the reference signal of the serving cell as an example, a calculation method for directly obtaining the signal quality measurement information RSRP according to the received channel weighting instruction and the reference signal of the serving cell includes, but not limited to, the following:

Assuming that a total quantity of samples of resource elements (RE) available for the reference signal of the serving cell within a measured bandwidth is K, the RSRP of the reference signal is an average absolute value of multiple correlation of two adjacent resource elements (RE, Resource Element) of the reference signal:

$$RSRP = \frac{1}{K-1}\left|\sum_{m=0}^{K-1} \hat{h}(m) \cdot \hat{h}(m+1)\right|,$$

where $\hat{h}(m)$ is channel estimation on a resource element numbered m, and $\hat{h}(m)$ may be obtained by using the least square method or another method in the prior art.

Step 304: Send the signal quality measurement information to the base station.

In addition, according to the manner in Embodiment 2 of the present invention, the terminal sends, to the base station together, the signal quality measurement information from the terminal to the adjacent cell and the signal quality measurement information, determined in step 303, from the terminal to the serving cell.

Specifically, in step 304, a manner in which the terminal sends the signal quality measurement information to the base station may include, but not limited to, the following several manners:

Manner 1: When it is determined according to information, carried in the received signal quality measurement configuration message, about a time for reporting a measurement result that the current time point has reached the reporting time, send the signal quality measurement information to the base station.

The information about the reporting time may be information about a periodical time (for example, reporting is performed every 10 seconds), or may be information about a specific time point (for example, 10 seconds after a measurement message is received), which is not limited herein.

Specifically, the carried information about the reporting time for reporting a measurement result is a subframe period and subframe offset information, the terminal determines, according to the subframe period and subframe offset information that are used for reporting the signal quality measurement information and that are carried in the received signal quality measurement configuration message, information about a time for reporting a measurement result, and when determining that the information of the time for reporting a measurement result arrives, sends the signal quality measurement information to the base station.

Optionally, the terminal may also send the measured reference signal and the obtained signal quality measurement information to the base station together.

Manner 2: When the determined signal quality measurement information is greater than a set threshold, send the signal quality measurement information to the base station.

The set threshold may be determined according to actual needs, or may be determined according to an A3 event defined in the LTE system, which is not limited herein.

Optionally, the set threshold may be determined according to the set threshold and the received signal quality measurement information that is determined according to the reference signal of the serving cell.

Specifically, first, the terminal determines whether the determined signal quality measurement information is greater than the set threshold.

Second, when a determining result of the terminal is that the determined signal quality measurement information is greater than the set threshold, send the obtained signal quality measurement information to the base station.

Optionally, the base station adjusts, according to the received signal quality measurement information, a downtilt angle of an antenna in the base station, so as to change signal coverage of the antenna.

By using the solution in Embodiment 3 of the present invention, problems of system resource wastes and poor quality of service of a signal that are caused by the fact that signal coverage areas overlap when a downtilt angle of an antenna is adjusted randomly in an active antenna system are avoided, thereby improving the efficiency of terminal switching between cells.

Embodiment 4

Figure 5:
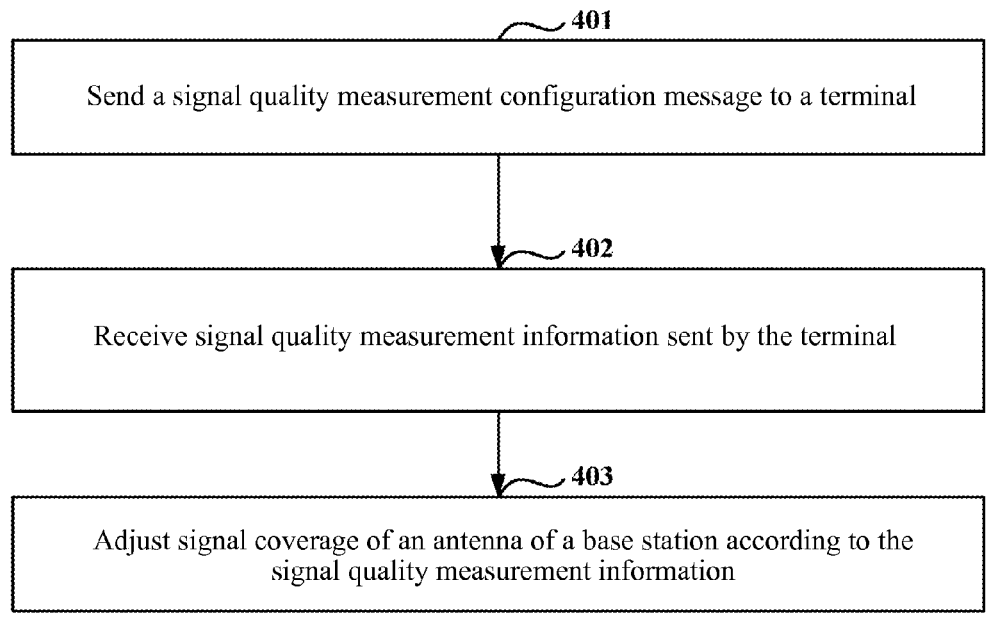
FIG. 5 is a schematic flowchart of a method for reporting signal quality measurement information according to Embodiment 4 of the present invention.

FIG. 5 is a schematic flowchart of a method for reporting signal quality measurement information according to Embodiment 4 of the present invention. Embodiment 4 of the present invention and Embodiment 1 of the present invention are solutions under a same invention conception, and the method includes:

Step 401: Send a signal quality measurement configuration message to a terminal.

The signal quality measurement configuration message may carry one or more of: a type of a signal that a terminal is instructed to measure, information about content of a reported measurement result, information about a time for reporting a measurement result, information about a trigger event of reporting a measurement result, and a channel weighting instruction, which is not limited herein.

It should be noted that, content carried in the signal quality measurement configuration message sent by a base station may be partially deployed according to actual needs, or may be all deployed in a unified manner according to theoretical needs, which is not limited herein.

Step 402: Receive signal quality measurement information sent by the terminal.

The signal quality measurement information is determined by the terminal according to the channel weighting instruction carried in the received signal quality measurement configuration message.

Specifically, the receiving signal quality measurement information sent by a terminal includes at least one or more of: receiving signal quality measurement information of an adjacent cell sent by the terminal, and receiving signal quality measurement information of a serving cell sent by the terminal.

The signal quality measurement information of the adjacent cell is obtained, after the terminal determines a channel weighting matrix of the adjacent cell according to the channel weighting instruction carried in the received signal quality measurement configuration message, according to the channel weighting matrix.

The determined channel weighting matrix is a precoding matrix in a codebook.

The signal quality measurement information of the serving cell is obtained, after the terminal receives a reference signal of the serving cell according to the channel weighting instruction carried in the received signal quality measurement configuration message, according to the reference signal.

The signal quality measurement information includes at least one or more of reference signal receiving power, a reference signal strength indicator, and reference signal receiving quality.

Optionally, a precoding matrix indicator PMI sent by the terminal is received.

The PMI corresponds to the determined channel weighting matrix of the adjacent cell.

Step 403: Adjust signal coverage of an antenna of the base station according to the signal quality measurement information.

Specifically, in step 403, the adjusting signal coverage of an antenna of the base station according to the received signal quality measurement information specifically includes:

adjusting, according to the received signal quality measurement information, a downtilt angle of an antenna configured in the base station, and further, changing signal coverage of the antenna according to the adjustment of the downtilt angle of the antenna, where when the downtilt angle increases, the signal coverage of the antenna increases; otherwise, the signal coverage of the antenna decreases.

Optionally, the signal quality measurement information not only includes signal quality measurement information from the terminal to the adjacent cell that is determined by the terminal according to the channel weighting instruction carried in the received signal quality measurement configuration message, but also includes signal quality measurement information from the terminal to the serving cell that is determined by the terminal according to the channel weighting instruction carried in the received signal quality measurement configuration message, and before the adjusting signal coverage of an antenna of the base station according to the signal quality measurement information, the method further includes the following:

First, compare the determined signal quality measurement information from the terminal to the serving cell with the determined signal quality measurement information from the terminal to the adjacent cell.

Second, determine, according to a comparison result, whether to adjust the signal coverage of the antenna configured in the base station.

Specifically, when a signal quality value corresponding to the determined signal quality measurement information from the terminal to the adjacent cell is greater than a signal quality value corresponding to the determined signal quality measurement information from the terminal to the serving cell, a message of adjusting the downtilt angle of the antenna is sent to the base station of the adjacent cell.

When the signal quality value corresponding to the determined signal quality measurement information from the terminal to the adjacent cell is not greater than the signal quality value corresponding to the signal quality measurement information from the terminal to the serving cell, the signal coverage of the antenna of the base station is adjusted according to the received determined signal quality measurement information from the terminal to the serving cell.

Embodiment 5

Figure 6:
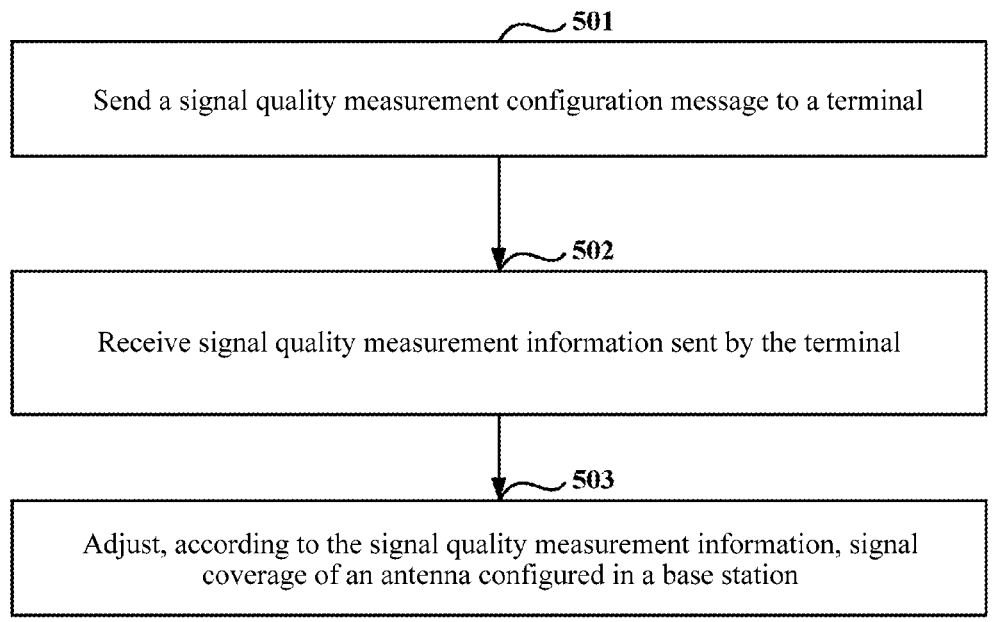
FIG. 6 is a schematic flowchart of a method for reporting signal quality measurement information according to Embodiment 5 of the present invention.

FIG. 6 is a schematic flowchart of a method for reporting signal quality measurement information according to Embodiment 5 of the present invention. Embodiment 5 of the present invention describes steps in Embodiment 4 of the present invention in detail, and the method includes:

Step 501: Send a signal quality measurement configuration message to a terminal.

The signal quality measurement configuration message may carry one or more of a type of a signal that a terminal is instructed to measure, information about content of a reported measurement result, information about a time for reporting a measurement result, information about a trigger event of reporting a measurement result, and a channel weighting instruction, which is not limited herein.

It should be noted that, content carried in the signal quality measurement configuration message sent by a base station may be partially deployed according to actual needs, or may be all deployed in a unified manner according to theoretical needs, which is not limited herein.

Step 502: Receive signal quality measurement information sent by the terminal.

The signal quality measurement information is determined by the terminal according to the channel weighting instruction carried in the received signal quality measurement configuration message.

Specifically, signal quality measurement information of an adjacent cell sent by the terminal is received, where the signal quality measurement information of the adjacent cell is obtained, after the terminal determines a channel weighting matrix of the adjacent cell according to the channel weighting instruction carried in the received signal quality measurement configuration message, according to the channel weighting matrix.

The determined channel weighting matrix is a precoding matrix in a codebook, and the signal quality measurement information includes at least one or more of reference signal receiving power, a reference signal strength indicator, and reference signal receiving quality.

Optionally, a precoding matrix indicator PMI sent by the terminal is received.

The PMI corresponds to the determined channel weighting matrix of the adjacent cell.

Step 503: Adjust, according to the signal quality measurement information, signal coverage of an antenna configured in the base station.

Specifically, in step 503, the adjusting, according to the signal quality measurement information, signal coverage of an antenna configured in the base station specifically includes:

adjusting, according to the signal quality measurement information, a downtilt angle of an antenna configured in the base station, and further, changing signal coverage of the antenna according to the adjustment of the downtilt angle of the antenna, where when the downtilt angle increases, the signal coverage of the antenna increases; otherwise, the signal coverage of the antenna decreases.

Embodiment 6

Figure 7:
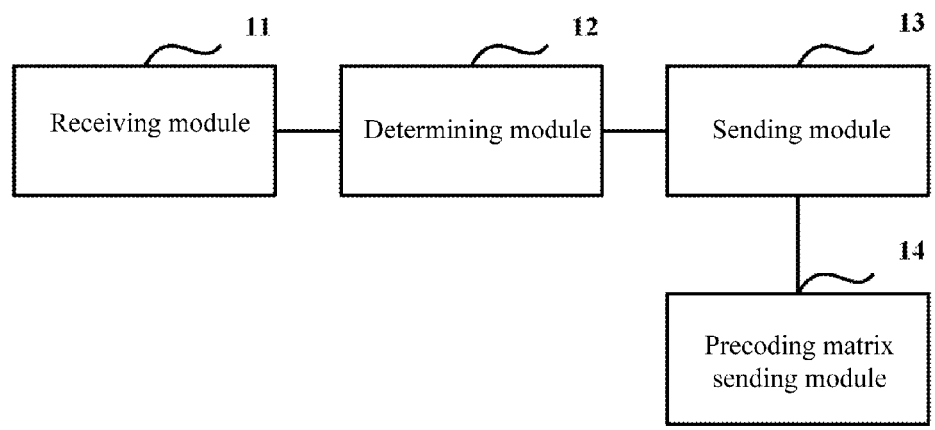
FIG. 7 is a schematic structural diagram of a terminal device according to Embodiment 6 of the present invention.

FIG. 7 is a schematic structural diagram of a terminal device according to Embodiment 6 of the present invention. The terminal device provided in Embodiment 6 of the present invention is a device under a same invention conception of Embodiment 1 of the present invention to Embodiment 5 of the present invention, and includes a receiving module 11, a determining module 12, and a sending module 13.

The receiving module 11 is configured to receive a signal quality measurement configuration message sent by a base station.

The determining module 12 is configured to determine signal quality measurement information according to a channel weighting instruction carried in the signal quality measurement configuration message received by the receiving module.

The sending module 13 is configured to send the signal quality measurement information determined by the determining module to the base station.

Specifically, the determining module 12 is configured to determine a channel weighting matrix of an adjacent cell according to the channel weighting instruction carried in the signal quality measurement configuration message received by the receiving module, and determine signal quality measurement information of the adjacent cell according to the channel weighting matrix.

Specifically, the determined channel weighting matrix of the adjacent cell is a precoding matrix in a codebook.

The device further includes a precoding indicator sending module 14, where the precoding indicator sending module 14 is configured to send a precoding matrix indicator PMI to the base station, where the PMI corresponds to the determined channel weighting matrix of the adjacent cell.

Specifically, the determining module 12 is configured to receive a reference signal of a serving cell according to the channel weighting instruction carried in the signal quality measurement configuration message received by the receiving module, and obtain signal quality measurement information of the serving cell according to the reference signal.

Specifically, the signal quality measurement information includes at least one or more of reference signal receiving power, a reference signal strength indicator, and reference signal receiving quality.

Specifically, the sending module 13 is configured to send the signal quality measurement information to the base station according to a subframe period and subframe offset information that are carried in the signal quality measurement configuration message received by the receiving module.

Specifically, the sending module 13 is configured to: when the signal quality measurement information determined by the determining module is greater than a set threshold, send the signal quality measurement information to the base station.

Embodiment 7

Figure 8:
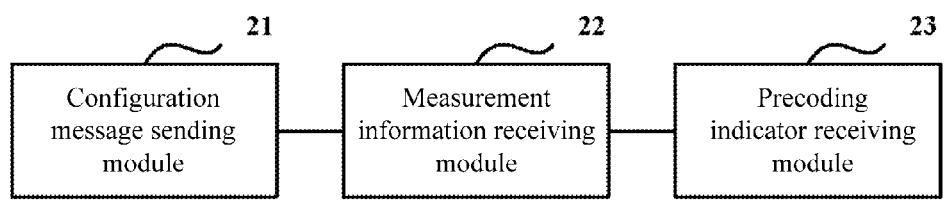
FIG. 8 is a schematic structural diagram of a base station device according to Embodiment 7 of the present invention.

FIG. 8 is a schematic structural diagram of a base station device according to Embodiment 7 of the present invention. The base station device provided in Embodiment 7 of the present invention is a device under a same invention conception of Embodiment 1 of the present invention to Embodiment 5 of the present invention, and includes a configuration message sending module 21 and a measurement information receiving module 22.

The configuration message sending module 21 is configured to send a signal quality measurement configuration message to a terminal, where the signal quality measurement configuration message carries a channel weighting instruction.

The measurement information receiving module 22 is configured to receive signal quality measurement information sent by the terminal, where the signal quality measurement information is determined by the terminal according to the channel weighting instruction carried in the received signal quality measurement configuration message.

Specifically, the measurement information receiving module 22 is configured to receive signal quality measurement information of an adjacent cell sent by the terminal, where the signal quality measurement information of the adjacent cell is obtained, after the terminal determines a channel weighting matrix of the adjacent cell according to the channel weighting instruction carried in the received signal quality measurement configuration message, according to the channel weighting matrix.

Specifically, the determined channel weighting matrix is a precoding matrix in a codebook.

The device further includes a precoding indicator receiving module 23, where the precoding indicator receiving module 23 is configured to receive a precoding matrix indicator PMI sent by the terminal, where the PMI corresponds to the determined channel weighting matrix of the adjacent cell.

Specifically, the measurement information receiving module 22 is configured to receive signal quality measurement information of a serving cell sent by the terminal, where the signal quality measurement information of the serving cell is obtained, after the terminal receives a reference signal of the serving cell according to the channel weighting instruction carried in the received signal quality measurement configuration message, according to the reference signal.

Specifically, the signal quality measurement information includes at least one or more of reference signal receiving power, a reference signal strength indicator, and reference signal receiving quality.

Embodiment 8

Figure 9:
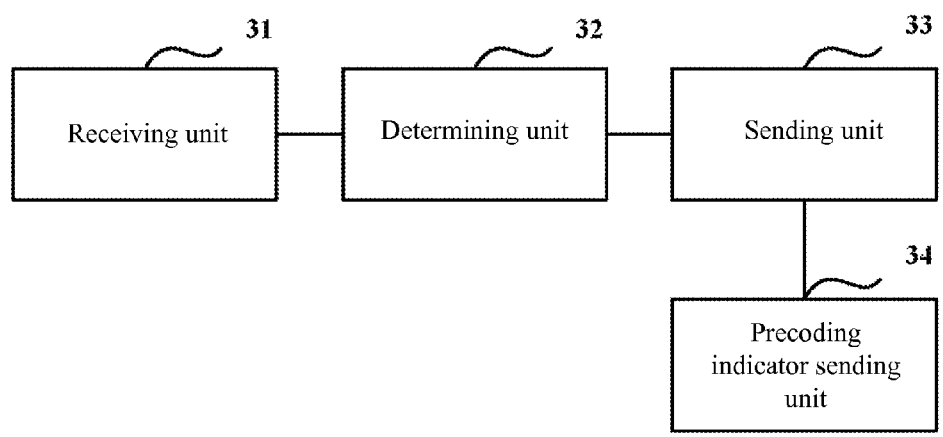
FIG. 9 is a schematic structural diagram of a device for reporting signal quality measurement information according to Embodiment 8 of the present invention.

FIG. 9 is a schematic structural diagram of a device for reporting signal quality measurement information according to Embodiment 8 of the present invention. The provided in Embodiment 8 of the present invention is a device under a same invention conception of Embodiment 1 of the present invention to Embodiment 5 of the present invention, and includes s receiving unit 31, a determining unit 32, and a sending unit 33.

The receiving unit 31 is configured to receive a signal quality measurement configuration message sent by a base station.

The determining unit 32 is configured to determine signal quality measurement information according to a channel weighting instruction carried in the received signal quality measurement configuration message.

The sending unit 33 is configured to send the signal quality measurement information to the base station.

Specifically, the determining unit 33 is configured to determine a channel weighting matrix of an adjacent cell according to the channel weighting instruction carried in the received signal quality measurement configuration message, and determine signal quality measurement information of the adjacent cell according to the channel weighting matrix.

Specifically, the determined channel weighting matrix of the adjacent cell is a precoding matrix in a codebook.

The device further includes a precoding indicator sending unit 34, where the precoding indicator sending unit 34 is configured to send a precoding matrix indicator PMI to the base station, where the PMI corresponds to the determined channel weighting matrix of the adjacent cell.

Specifically, the determining unit 32 is configured to receive a reference signal of a serving cell according to the channel weighting instruction carried in the received signal quality measurement configuration message, and obtain signal quality measurement information of the serving cell according to the reference signal.

Specifically, the signal quality measurement information includes at least one or more of reference signal receiving power, a reference signal strength indicator, and reference signal receiving quality.

Specifically, the sending unit 33 is configured to send the signal quality measurement information to the base station according to a subframe period and subframe offset information that are carried in the received signal quality measurement configuration message.

Specifically, the sending unit 33 is configured to: when the determined signal quality measurement information is greater than a set threshold, send the signal quality measurement information to the base station.

Embodiment 9

Figure 10:
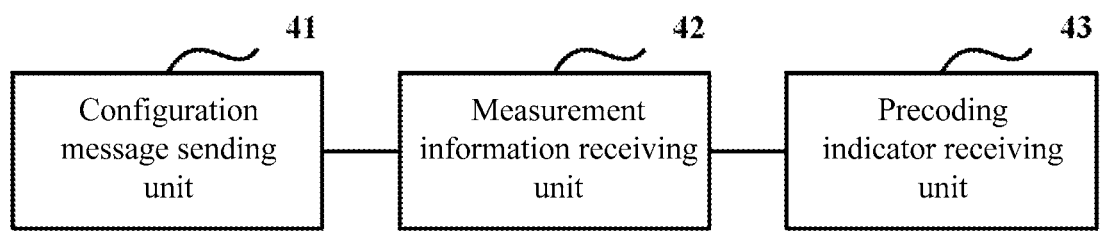
FIG. 10 is a schematic structural diagram of a device for reporting signal quality measurement information according to Embodiment 9 of the present invention.

FIG. 10 is a schematic structural diagram of a device for reporting signal quality measurement information according to Embodiment 9 of the present invention. The device provided in Embodiment 9 of the present invention is a device under a same invention conception of Embodiment 1 of the present invention to Embodiment 5 of the present invention, and includes a configuration message sending unit 41 and a measurement information receiving unit 42.

The configuration message sending unit 41 is configured to send a signal quality measurement configuration message to a terminal, where the signal quality measurement configuration message carries a channel weighting instruction.

The measurement information receiving unit 42 is configured to receive signal quality measurement information sent by the terminal, where the signal quality measurement information is determined by the terminal according to the channel weighting instruction carried in the received signal quality measurement configuration message.

Specifically, the measurement information receiving unit 42 is configured to receive signal quality measurement information of an adjacent cell sent by the terminal, where the signal quality measurement information of the adjacent cell is obtained, after the terminal determines a channel weighting matrix of the adjacent cell according to the channel weighting instruction carried in the received signal quality measurement configuration message, according to the channel weighting matrix.

Specifically, the determined channel weighting matrix is a precoding matrix in a codebook.

The device further includes a precoding indicator receiving unit 43, where the precoding indicator receiving unit 43 is configured to receive a precoding matrix indicator PMI sent by the terminal, where the PMI corresponds to the determined channel weighting matrix of the adjacent cell.

Specifically, the measurement information receiving unit 42 is configured to receive signal quality measurement information of a serving cell sent by the terminal, where the signal quality measurement information of the serving cell is obtained, after the terminal receives a reference signal of the serving cell according to the channel weighting instruction carried in the received signal quality measurement configuration message, according to the reference signal.

Specifically, the signal quality measurement information includes at least one or more of reference signal receiving power, a reference signal strength indicator, and reference signal receiving quality.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method of configuring a terminal to report signal quality measurement information in a cellular network, the terminal comprising at least one hardware processor coupled to a memory programmed with instructions that, when executed by the processor, performs the method comprising:
receiving, by the terminal, a signal quality measurement configuration message (SQMCM) sent by a base station, the SQMCM identifying an object signal in a plurality of measurable object signals, a cell in a plurality of cells for which the object signal is to be measured, and a channel weighting instruction that includes a channel feature to measure, wherein the channel weighting instruction instructs the terminal to perform weighting processing on a channel matrix from the terminal to an adjacent cell according to the received channel weighting instruction and a reference signal of the adjacent cell;
configuring the terminal to measure the signal quality of the object signal specified in the SQMCM for the cell specified in the SQMCM, wherein configuring the terminal comprises configuring the terminal to:
determine the object signal identified in the SQMCM;
determine the cell to be measured specified in the SQMCM;
determine the channel weighting instruction and channel feature to measure, specified in the SQMCM;
measure, by the terminal, signal quality measurement information of the object signal for the determined cell according to the channel weighting instruction carried in the received signal quality measurement configuration message; and
send the signal quality measurement information of the object signal for the determined cell to the base station.

2. The method according to claim 1, wherein the measuring signal quality measurement information according to the channel weighting instruction carried in the received signal quality measurement configuration message comprises:
determining a channel weighting matrix of the adjacent cell according to the channel weighting instruction carried in the received signal quality measurement configuration message; and
determining signal quality measurement information of the adjacent cell according to the channel weighting matrix.

3. The method according to claim 2, wherein the determined channel weighting matrix of the adjacent cell is a precoding matrix in a codebook; and the method further comprises:
sending a precoding matrix indicator (PMI) to the base station, wherein the PMI corresponds to the determined channel weighting matrix of the adjacent cell.

4. The method according to claim 1 wherein the measuring signal quality measurement information according to the channel weighting instruction carried in the received signal quality measurement configuration message comprises:
receiving a reference signal of a serving cell according to the channel weighting instruction carried in the received signal quality measurement configuration message; and
obtaining signal quality measurement information of the serving cell according to the reference signal.

5. The method according to claim 4, wherein the signal quality measurement information comprises at least one or more of: a reference signal receiving power, a reference signal strength indicator, and a reference signal receiving quality.

6. The method according to claim 1, wherein the sending the signal quality measurement information to the base station comprises:
sending the signal quality measurement information to the base station according to a subframe period and subframe offset information that are carried in the received signal quality measurement configuration message.

7. The method according to claim 1, wherein the sending the signal quality measurement information to the base station comprises:
when the determined signal quality measurement information is greater than a set threshold, sending the signal quality measurement information to the base station.

8. A method for reporting signal quality measurement information performed on a base station in a cellular network, the base station comprising at least one hardware processor coupled to a memory programmed with instructions that, when executed by the processor, perform the method, comprising:
sending a signal quality measurement configuration message (SQMCM) to a terminal, wherein the SQMCM specifies a channel weighting instruction that includes a channel feature of an object signal to measure, and identifies the object signal in a plurality of measureable object signals, and specifies a cell in a plurality of cells for which the object signal is to be measured, wherein the channel weighting instruction instructs the terminal to perform weighting processing on a channel matrix from the terminal to an adjacent cell according to the received channel weighting instruction and a reference signal of the adjacent cell; and
receiving, from the terminal, the signal quality measurement information of the object signal for the cell specified in the SQMCM sent to the terminal, the signal quality measurement information having been determined by the terminal according to the channel weighting instruction carried in the received signal quality measurement configuration message.

9. The method according to claim 8, wherein the receiving signal quality measurement information sent by the terminal comprises:
receiving the signal quality measurement information of the adjacent cell sent by the terminal, the signal quality measurement information of the adjacent cell having been obtained, after the terminal determined a channel weighting matrix of the adjacent cell according to the channel weighting instruction carried in the received signal quality measurement configuration message, according to the channel weighting matrix.

10. The method according to claim 9, wherein the determined channel weighting matrix is a precoding matrix in a codebook; and
the method further comprises:
receiving a precoding matrix indicator (PMI) sent by the terminal, wherein the PMI corresponds to the determined channel weighting matrix of the adjacent cell.

11. The method according to claim 8, wherein the receiving signal quality measurement information sent by the terminal comprises:
receiving signal quality measurement information of a serving cell sent by the terminal, the signal quality measurement information of the serving cell having been obtained, after the terminal received a reference signal of the serving cell according to the channel weighting instruction carried in the received signal quality measurement configuration message, according to the reference signal.

12. The method according to claim 11, wherein the signal quality measurement information comprises at least one or more of: a reference signal receiving power, a reference signal strength indicator, and a reference signal receiving quality.

13. A terminal device, comprising:
a receiver, configured to receive a signal quality measurement configuration message (SQMCM) sent by a base station, the SQMCM specifying an object signal in a plurality of measurable object signals, a cell in a plurality of cells for which the object signal is to be measured, and a channel weighting instruction that includes a channel feature to measure, wherein the channel weighting instruction instructs the terminal device to perform weighting processing on a channel matrix from the terminal device to an adjacent cell according to the received channel weighting instruction and a reference signal of the adjacent cell;
a processor, programmed to configure the terminal device to measure the signal quality of the object signal specified in the SQMCM for the cell specified in the SQMCM, wherein configuring the terminal comprises configuring the terminal to:
determine the object signal identified in the SQMCM;
determine the cell to be measured specified in the SQMCM;
determine the channel weighting instruction and channel feature to measure, specified in the SQMCM;
measure signal quality measurement information of the object signal for the determined cell according to the channel weighting instruction carried in the signal quality measurement configuration message received by the receiver; and
a transmitter, configured to send the signal quality measurement information of the object signal for the cell to the base station.

14. The device according to claim 13, wherein the processor is configured to determine a channel weighting matrix of the adjacent cell according to the channel weighting instruction carried in the received signal quality measurement configuration message, and determine signal quality measurement information of the adjacent cell according to the channel weighting matrix.

15. The device according to claim 14, wherein the determined channel weighting matrix of the adjacent cell is a precoding matrix in a codebook; and
the device further comprises:
a precoding indicator transmitter, configured to send a precoding matrix indicator (PMI) to the base station, wherein the PMI corresponds to the determined channel weighting matrix of the adjacent cell.

16. The device according to claim 13, wherein the processor is configured to receive a reference signal of a serving cell according to the channel weighting instruction carried in the signal quality measurement configuration message received by the receiver, and obtain signal quality measurement information of the serving cell according to the reference signal.

17. The device according to claim 16, wherein the signal quality measurement information comprises at least one or more of: a reference signal receiving power, a reference signal strength indicator, and a reference signal receiving quality.

18. The device according to claim 13, wherein the transmitter is configured to send the signal quality measurement information to the base station according to a subframe period and subframe offset information that are carried in the signal quality measurement configuration message received by the receiver.

19. The device according to claim 13, wherein the transmitter is configured to: when the signal quality measurement information determined by the processor is greater than a set threshold, send the signal quality measurement information to the base station.

20. A base station device, comprising:
a configuration message transmitter, configured to send a signal quality measurement configuration message (SQMCM) to a terminal, wherein the SQMCM specifies a channel weighting instruction that includes a channel feature of an object signal to measure, and identifies the object signal in a plurality of measureable object signals, and specifies a cell in a plurality of cells for which the object signal is to be measured, wherein the channel weighting instruction instructs the terminal to perform weighting processing on a channel matrix from the terminal to an adjacent cell according to the received channel weighting instruction and a reference signal of the adjacent cell; and
a measurement information receiver, configured to receive, from the terminal, the signal quality measurement information of the object signal for the cell specified in the SQMCM sent to the terminal, the signal quality information having been determined by the terminal according to the channel weighting instruction specified in the signal quality measurement configuration message sent to the terminal.

21. The device according to claim 20, wherein the measurement information receiver is configured to receive signal quality measurement information of the adjacent cell sent by the terminal, the signal quality measurement information of the adjacent cell having been obtained, after the terminal determined a channel weighting matrix of the adjacent cell according to the channel weighting instruction carried in the received signal quality measurement configuration message, according to the channel weighting matrix.

22. The device according to claim 21, wherein the determined channel weighting matrix is a precoding matrix in a codebook; and the device further comprises:
a precoding indicator receiver, configured to receive a precoding matrix indicator (PMI) sent by the terminal, wherein the PMI corresponds to the determined channel weighting matrix of the adjacent cell.

23. The device according to claim 20, wherein the measurement information receiver is configured to receive signal quality measurement information of a serving cell sent by the terminal, the signal quality measurement information of the serving cell having been obtained, after the terminal received a reference signal of the serving cell according to the channel weighting instruction carried in the received signal quality measurement configuration message, according to the reference signal.

24. The device according to claim 23, wherein the signal quality measurement information comprises at least one or more of: a reference signal receiving power, a reference signal strength indicator, and a reference signal receiving quality.

* * * * *